US009145983B2

(12) United States Patent
Smith, III

(10) Patent No.: US 9,145,983 B2
(45) Date of Patent: Sep. 29, 2015

(54) DUMMY UNDERSEA HYDRAULIC COUPLING MEMBER

(71) Applicant: National Coupling Company, Inc., Stafford, TX (US)

(72) Inventor: Robert E. Smith, III, Missouri City, TX (US)

(73) Assignee: National Coupling Company, Inc.

( * ) Notice: Subject to any disclaimer, the term of this patent is extended or adjusted under 35 U.S.C. 154(b) by 31 days.

(21) Appl. No.: 14/077,976

(22) Filed: Nov. 12, 2013

(65) Prior Publication Data

US 2014/0131606 A1 May 15, 2014

Related U.S. Application Data

(60) Provisional application No. 61/726,970, filed on Nov. 15, 2012.

(51) Int. Cl.
| *F16L 1/26* | (2006.01) |
| --- | --- |
| *F16L 37/32* | (2006.01) |
| *E21B 34/04* | (2006.01) |
| *F16L 37/40* | (2006.01) |
| *F16L 37/05* | (2006.01) |
| *F16L 29/02* | (2006.01) |
| *F16L 29/04* | (2006.01) |
| *E21B 33/035* | (2006.01) |

(52) U.S. Cl.
CPC .............. *F16L 1/26* (2013.01); *E21B 33/0355* (2013.01); *E21B 34/04* (2013.01); *F16L 29/02* (2013.01); *F16L 29/04* (2013.01); *F16L 37/05* (2013.01); *F16L 37/32* (2013.01); *F16L 37/40* (2013.01); *Y10T 137/87957* (2015.04)

(58) Field of Classification Search
CPC ............. F16L 1/26; F16L 37/40; F16L 29/04; F16L 37/32; F16L 29/02; F16L 37/02; F16L 37/05; E21B 34/04
USPC .......... 137/614.03–614.05; 251/149.1, 149.6, 251/149.7, 282
See application file for complete search history.

(56) References Cited

U.S. PATENT DOCUMENTS

| 4,637,470 | A | * | 1/1987 | Weathers et al. ........ 137/614.04 |
| --- | --- | --- | --- | --- |
| 5,692,538 | A | | 12/1997 | Smith, III |
| 6,394,131 | B1 | * | 5/2002 | Fross et al. ............... 137/614.05 |
| 6,575,430 | B1 | | 6/2003 | Smith, III |
| 6,631,734 | B2 | | 10/2003 | Smith, III |
| 6,692,347 | B1 | | 2/2004 | Schneider |
| 6,962,347 | B2 | | 11/2005 | Smith, III |
| 7,163,190 | B2 | | 1/2007 | Smith, III |

OTHER PUBLICATIONS

Combined Search and Examination Report regarding corresponding Great Britain Application No. 1320010.0, dated Apr. 11, 2014.

* cited by examiner

*Primary Examiner* — Kevin Lee
(74) *Attorney, Agent, or Firm* — Blank Rome LLP.

(57) ABSTRACT

A dummy undersea hydraulic coupling member protects an opposing undersea hydraulic coupling member when the hydraulic lines are not operating. The dummy undersea hydraulic coupling member has a water displacement expansion chamber with a piston in the chamber that allows trapped water and/or air to move from the receiving chamber into the water displacement expansion chamber during connection of the dummy coupling member to the opposing coupling member. The piston has both a primary seal and a secondary, hydrostatic seal for preventing seawater from entering the portion of the water displacement expansion chamber that is contacted by the primary seal.

19 Claims, 6 Drawing Sheets

DUMMY UNDERSEA HYDRAULIC COUPLING MEMBER

CROSS-REFERENCE TO RELATED APPLICATIONS

This application claims the benefit of U.S. Provisional Application No. 61/726,970, filed on Nov. 15, 2012.

STATEMENT REGARDING FEDERALLY SPONSORED RESEARCH OR DEVELOPMENT:
Not Applicable

BACKGROUND OF THE INVENTION

1. Field of the Invention.

This invention relates in general to hydraulic couplings, and specifically to hydraulic couplings used in undersea oil well drilling and production applications. More particularly, this invention involves a dummy undersea hydraulic coupling member that may be used for protecting an opposing coupling member that is stationed subsea.

2. Description of the Related Art including information disclosed under 37 CFR 1.97 and 1.98.

A variety of subsea hydraulic couplings are known in the art. The couplings generally consist of a male member and a female member with sealed fluid passageways connecting therebetween. The female member generally is a cylindrical body with a relatively large diameter longitudinal bore at one end and relatively small diameter longitudinal bore at the other. The small bore facilitates connections to hydraulic lines, while the large bore seals and slidingly engages the male member of the coupling. The male member includes a cylindrical portion at one having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Several couplings of this type are disclosed in patents owned by National Coupling Company, Inc. of Stafford, Tex.

In undersea drilling and production applications, the male member of the coupling may be connected to a manifold plate or other securement at a subsea location at the inside or outside of a well bore. In many cases, the male members are positioned so that the end or leading face of each member points vertically up from the sea floor. The female members, which also may be secured to a manifold plate, are moved into position over the male members and then lowered onto the male members by a diver or subsea vehicle, such as an ROV (remotely operated vehicle). When the female members are positioned on the male members, hydraulic fluid flow is typically from the female member to the male member of each coupling. Typically, one or both of the coupling members have poppet valves.

Each poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

When the male and female coupling members are disconnected, the male coupling members typically remain subsea, and the female coupling members are retrieved. Frequently, well bores in which the couplings are positioned contain debris. The male member, which remains subsea when the coupling is disconnected, is subject to debris accumulating in exposed flow passages when it is disconnected from the female member. The debris may contaminate the hydraulic fluid or cause wear to the seals and sealing surfaces in the hydraulic couplings and hydraulic system. Additionally, the coupling members that remain subsea are subject to marine growth, sand, silt, and other mechanical impacts unless there is some form of protection.

To reduce or prevent damage to the coupling member remaining subsea, dummy coupling members have been used. A dummy coupling member mates with the opposing coupling member, but the dummy is not connected to hydraulic lines and therefore does not function to conduct hydraulic fluid through the system. Instead, the dummy coupling member protects the opposing coupling member when the hydraulic line through that coupling is not in use. One particular dummy hydraulic coupling member of the prior art is described in U.S. Pat. No. 6,631,734.

Typically, dummy undersea coupling members are the female coupling member because the male coupling member remains subsea. Dummy female coupling members may have one or more seals in a receiving chamber, and these seals engage the male member when the male member enters the receiving chamber. Dummy female coupling members also may have a bore and/or a vent passage extending between the receiving chamber and an outer surface of the dummy coupling member body. This allows trapped seawater and/or trapped air in the receiving chamber to escape out of the receiving chamber of the dummy coupling member when it engages the opposing coupling member. However, the bore or vent passage also may be subject to ingress of silt, debris, etc., with less effective protection of the opposing coupling member.

Unless the trapped seawater or air is allowed to escape from the receiving chamber, it may be very difficult or impossible to fully mate the dummy coupling to the opposing coupling member. Another undesirable consequence that may occur if trapped seawater or trapped air is not allowed to escape, is due to increased pressure that may force the poppet valve of the opposing coupling member open and allow the trapped seawater or trapped air to enter the hydraulic lines. Disconnecting the dummy coupling member from the opposing member also may be difficult due to hydraulic lock.

Thus, a dummy undersea hydraulic coupling member is needed to prevent debris and marine growth and other objects from damaging the coupling member remaining subsea, and which allows the dummy coupling member to be engaged and disengaged from the opposing member without resistance due to trapped seawater and/or trapped air.

U.S. Pat. No. 5,692,538 to Robert E. Smith III, assigned to National Coupling Company, Inc., does not show a dummy coupling member, but shows an undersea hydraulic coupling member having angled flow passages in the body of the male member to help prevent ingress of debris. When the female member is attached to the male member, hydraulic pressure through the angled flow ports and against the face of the poppet valve urges the poppet valve of the male member open to allow fluid to flow between the coupling members. The poppet valve in combination with the angled flow ports in the male member body help prevent ingress of debris, while allowing trapped hydraulic fluid pressure to bleed off when the coupling members are disconnected.

BRIEF SUMMARY OF THE INVENTION

The present invention is embodied in a dummy undersea hydraulic coupling member having a water displacement expansion chamber and a piston for varying the volume of the water displacement expansion chamber in response to the pressures acting on the opposing faces of the piston. When the dummy coupling member is connected to an opposing coupling member subsea, seawater and/or air in the receiving chamber of the dummy is displaced by the opposing coupling member. That seawater and/or air enters the water displacement expansion chamber, and the piston allows the volume of that chamber to increase as a result of pressure from displaced seawater and/or air acting on the front face of the piston until the chamber reaches the volume required for a pressure equilibrium.

When the dummy coupling member is disconnected from the opposing coupling member subsea, seawater pressure acting on the back face of the piston tends to urge the piston to decrease the volume of the water displacement expansion chamber, thus allowing the trapped seawater and/or air to prevent a vacuum in the receiving chamber. The piston decreases the size of the water displacement expansion chamber until it reaches the volume required for a pressure equilibrium.

BRIEF DESCRIPTION OF THE SEVERAL VIEWS OF THE DRAWING(S)

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE INVENTION

The invention may best be understood by reference to the exemplary embodiments illustrated in FIGS. 3 through 6. An understanding of the invention will be aided by concurrent reference to the dummy couplings of the prior art illustrated in FIGS. 1 and 2.

Figure 1:
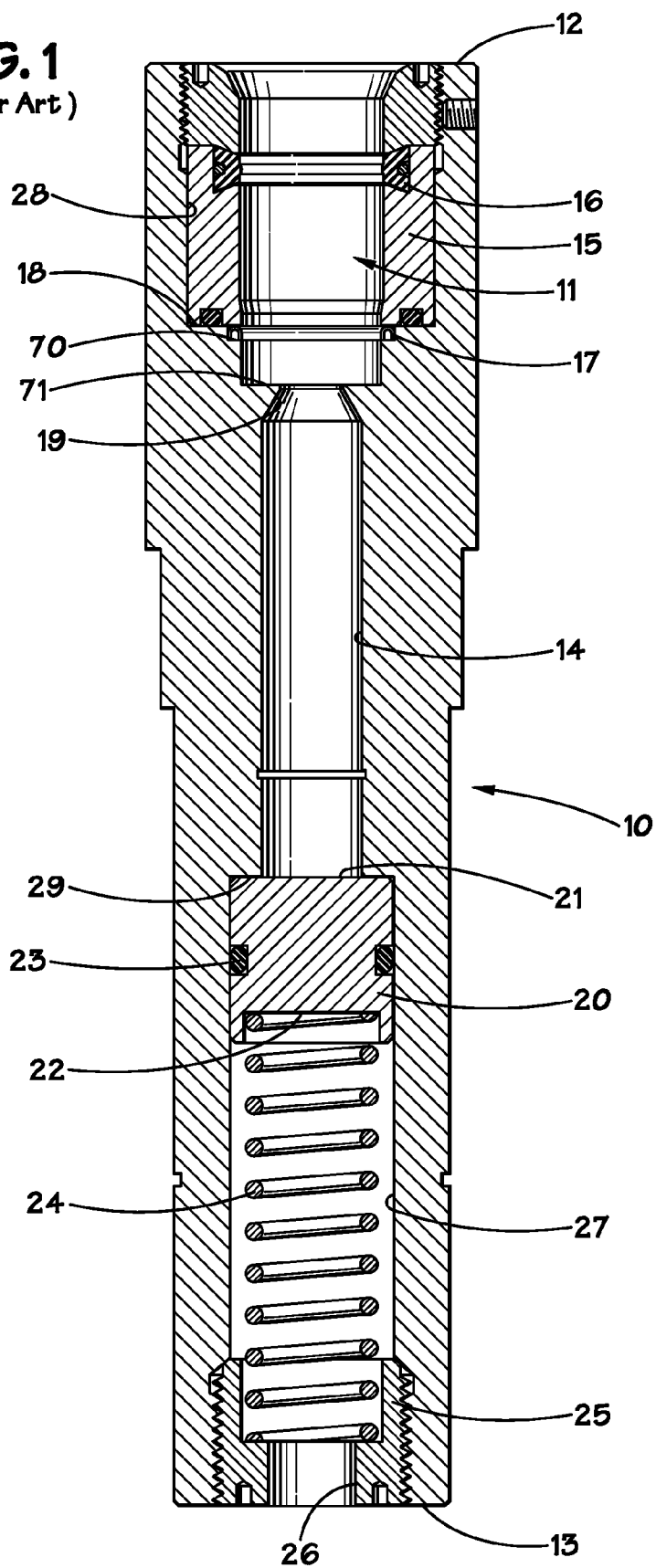
FIG. 1 is a section view of a dummy female coupling member according to the prior art.

Referring to FIG. 1, a dummy coupling member 10 according to the prior art has first end 12 and second end 13, and receiving chamber 11 for receiving the opposing male coupling member therein. The male member (not shown) typically is positioned on the subsea floor and in some instances faces upwardly from the subsea floor so that the leading face of the male coupling member faces upwardly. The male coupling members are commonly attached to a manifold plate using various means, such as set screws or threads, and the female coupling members often are attached to an opposing manifold plate. Techniques for attaching hydraulic coupling members to manifold plates are well known to those skilled in the art.

The receiving chamber of the dummy female coupling member may have one or more seals therein for engaging and sealing with the male member. In the coupling of FIG. 1, the dummy female coupling member includes a pressure-energized annular metal seal 17 that is retained on shoulder surface 70 by retainer 15. The retainer may be a sleeve-shaped body threaded to the female member. Or the retainer may be a two piece retainer with one piece having a sliding interfit with cylindrical wall 28 of the receiving chamber and inserted into the receiving chamber until it abuts internal shoulder 18, and a second piece threaded to the wall of the receiving chamber. Elastomeric seal 16 may be positioned between the two pieces. The elastomeric seal has a dovetail interfit with the two-piece retainer. The receiving chamber terminates at internal shoulder 70.

Adjacent the receiving chamber is the first section 14 and second section 27 of the water displacement expansion chamber. Although the water displacement expansion chamber in the coupling shown in FIG. 1 has a first section with a smaller diameter and a second section with a larger diameter, the chamber may have a single uniform diameter, or more than two diameters. In the coupling of FIG. 1, the first section of the water displacement expansion chamber has inclined shoulder 19.

In FIG. 1, piston 20 is positioned in the second section of the water displacement expansion chamber, and abuts internal shoulder 29 absent significantly higher water or air pressure acting on front face 21 of the piston. Spring 24 urges the piston against shoulder 29. Spring 24 is anchored by collar 25 which may be threaded or otherwise engaged to the second section of the water displacement expansion chamber adjacent second end 13 of the dummy female coupling member. The collar is a sleeve-shaped member having internal bore 26 therethrough to allow entry of water into the second section of the water displacement expansion chamber and exert pressure against rear face 22 of the piston. The piston which slides longitudinally in the water displacement expansion chamber should provide a sliding seal with the walls of the chamber, and in the coupling of FIG. 1, annular seal 23 is shown to provide such a seal.

When the dummy coupling female coupling member is connected to an opposing coupling member subsea, water and/or air in receiving chamber 11 is forced from the receiving chamber into first section 14 of the water displacement expansion chamber. The additional water and/or air pressure acting on front face 21 of piston 20 will urge the piston towards second end 13, expanding the water displacement expansion chamber until it has sufficient volume. The piston continues to expand the water displacement expansion chamber until the pressure of water and/or air acting on the front face of the piston is balanced to the pressure of seawater and spring 24 acting on rear face 22. In one particular coupling, the diameter of the piston is the same or substantially the same as the diameter of the male member entering the receiving chamber, to balance the pressure during connection and disconnection of the male member with the dummy female coupling member.

When the dummy coupling member is disconnected from the opposing coupling member, a vacuum is created in the receiving chamber and the water and/or air in the water displacement expansion chamber will fill that void and avoid hydraulic lock. This results from seawater pressure acting on the rear face of the piston exceeding the pressure acting on its front face. The piston then moves toward the first end of the dummy coupling member, until the pressure is equalized.

Figure 2:
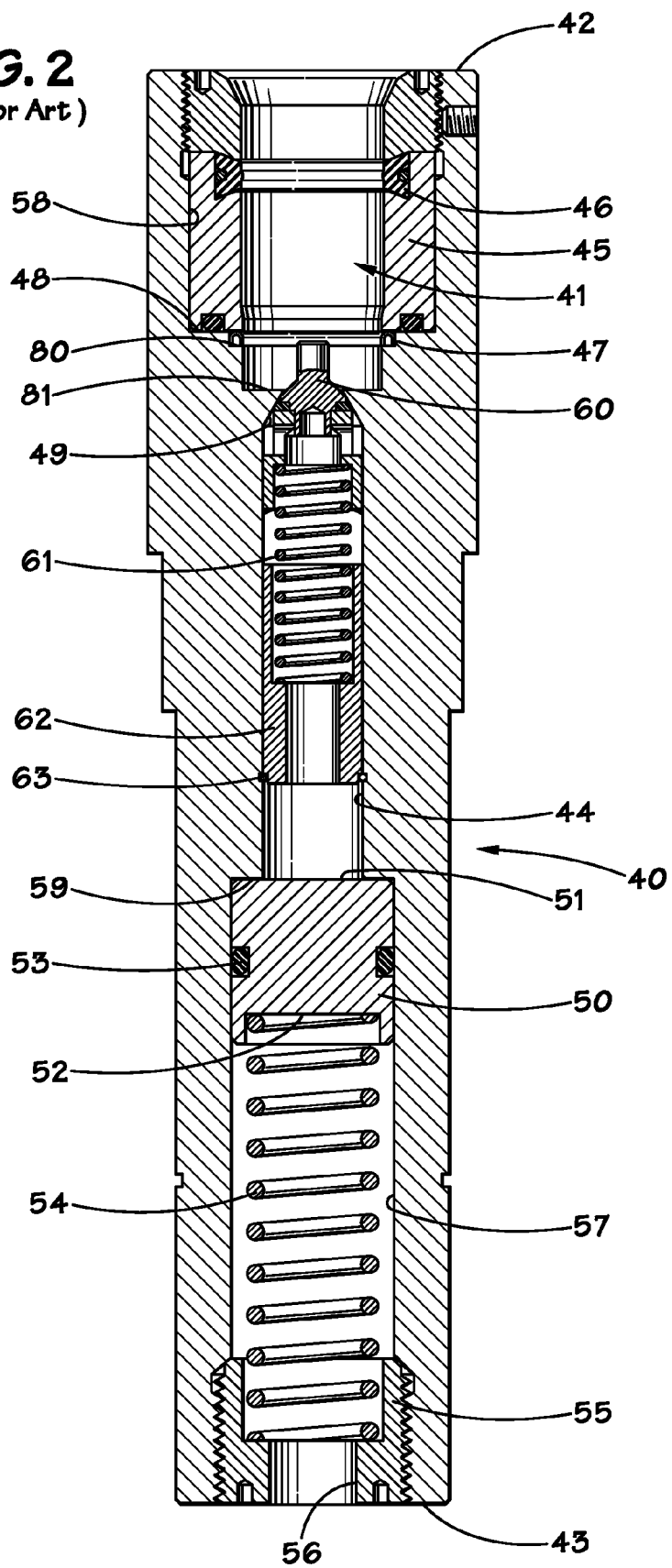
FIG. 2 is a section view of another dummy female coupling member according to the prior art.

Now referring to FIG. 2, a second coupling of the prior art is shown with dummy female coupling member 40 having first end 42, second end 43 and receiving chamber 41 for connection to a male coupling member. Retainer 45 is engaged to the dummy female coupling member adjacent the first end for retaining annular metal seal 47 on shoulder 80. Retainer 45 may be a one-piece or two piece retainer having a first piece in sliding engagement with receiving chamber wall 58 until it abuts shoulder 48. Elastomeric seal 46 is held between the two pieces of the retainer. The receiving chamber terminates at shoulder 81.

In the coupling of FIG. 2, poppet valve 60 is provided in first section 44 of the water displacement expansion chamber. The poppet valve is urged by valve spring 61 into the closed position against inclined shoulder 49. The valve spring is held by collar 62 and collar clip 63 engages the wall of the first section of the water displacement expansion chamber. In this coupling, when the dummy female coupling member is connected to the male member, water and/or air in the receiving chamber exerts pressure against poppet valve 60 to urge the poppet valve open, entering the water displacement expansion chamber.

Still referring to FIG. 2, piston 50 slides in second section 57 of the water displacement expansion chamber. Spring 54 urges front face 51 of the piston towards shoulder 59. The piston moves in sliding relationship with cylindrical wall 57 and has annular seal 53 to seal with the wall. The spring is anchored by collar 55 adjacent second end 43 of the dummy coupling member. Seawater entering through bore 56 in collar 55 acts against rear face 52 of the piston, until the pressure on each side of the piston is balanced.

Figure 3:
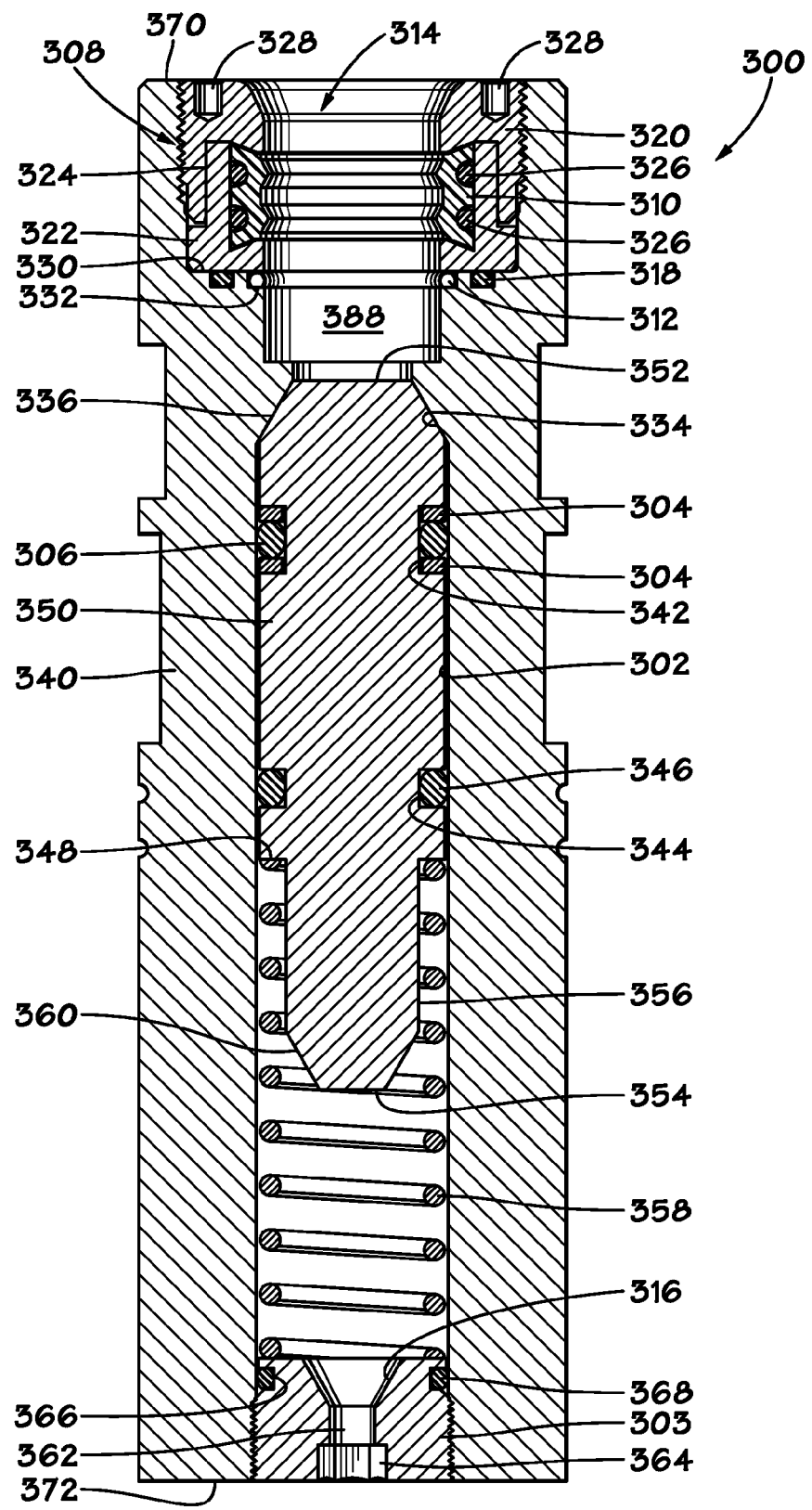
FIG. 3 is a cross-sectional view of a dummy female coupling member according to a first embodiment of the invention.

An improved dummy female hydraulic coupling according to one embodiment of the invention is shown in FIG. 3. Receiving chamber 314 has crown-type probe seal 310 contained in seal cartridge 308. A crown-type probe seal of the type illustrated is disclosed in U.S. Pat. No. 6,575,430. A seal cartridge of the type illustrated at 308 is disclosed in U.S. Pat. No. 7,163,190. Seal cartridge 308 is comprised of shell 322 and retainer 320 which have a sliding interference fit at 324. Retainer 320 is externally threaded for engaging an internally threaded portion of central axial bore 388 proximate first end 370 of coupling body 340. Retainer 320 may have spanner holes 328 for engagement with a tool for inserting and removing seal cartridge 308.

Retainer 320 and shell 322 have angled shoulders on their inner, cylindrical surfaces configured to engage corresponding surfaces on the ends of ring-shaped probe seal 310. The outer circumference of probe seal 310 may have one or more grooves for holding O-ring seals 326 which may act to seal between probe seal 310 and shell 322.

Seal cartridge 308 retains metal C-seal 312 on shoulder 332 within bore 388 of coupling member 300. A metal C-seal of the type illustrated is disclosed in U.S. Pat. No. 6,962,347. O-ring 318 in a groove on shoulder 330 provides a seal between seal cartridge 308 and body 340 of coupling member 300.

Piston 350 is provided in a portion of bore 388 (which may act as a cylinder within which piston 350 slides). Piston 350 has a first end 352 oriented towards first end 370 of coupling body 340 and an opposing second end 354 oriented towards second end 372 of coupling body 340.

First end 352 of piston 350 may have a frusto-conical surface 336 which bears against a corresponding frusto-conical surface 334 on the inner surface of bore 388 to provide a metal-to-metal seal.

Second end 354 of piston 350 comprises a portion of reduced outer diameter 356 which forms shoulder 348 in the body of piston 350. Frusto-conical surface 360 may be provided in portion 356 proximate second end 354.

Compression spring 358 bears against shoulder 348 at one end thereof and against spring seat 303 at a second end thereof. Spring seat 303 may be externally threaded and engage an internally-threaded portion of bore 388 proximate second end 372. A groove 366 in the external, cylindrical surface of spring seat 303 may contain O-ring seal 368.

Spring seat 303 has central axial bore 362 which has frusto-conical surface 316 at one end and hexagonal wrench receiver 364 at an opposing end thereof. Frusto-conical surface 316 may be sized and configured to bear against surface 360 on piston 350 when it is at one extreme of its travel (downward in FIG. 3) thereby providing a metal-to-metal seal between piston 350 and spring seat 303.

In the absence of differential fluid pressure, spring 358 acting between spring seat 303 and shoulder 348 on piston 350 urges piston 350 against surface 334.

Annular groove 342 in the outer circumference of piston 350 contains the primary seal which may comprise O-ring 306 flanked by a pair of back up rings 304.

Annular groove 344 in the outer circumference of piston 350 contains the secondary seal which may comprise O-ring 346. Secondary seal 346 acts to prevent seawater from contacting the portion of bore 388 indicated at 302 thereby providing an uncontaminated surface for primary seal 306 to seal against. It will be appreciated by those skilled in the art that the axial distance between primary seal 306 and secondary seal 346 should not be less than the full stroke of piston 350 in order to ensure that primary seal 306 contacts only protected portion 302 of bore 388 during a full stroke of piston 350.

In the embodiment illustrated in FIG. 3, the piston is moveable within the bore of the coupling member. Frusto-conical surfaces provide metal-to-metal seals, as indicated, at opposing ends of the piston. The spring (358) urges the piston upward in FIG. 3. Under the influence of hydraulic fluid pressure from the probe of a male coupling member (not shown) inserted in receiving chamber 314, the piston may move downward in FIG. 3 and establish a metal-to-metal seal at frusto-conical seat 316 on the bottom seat. However, fluid is also retained by the main seal which, in the illustrated embodiment, is comprised of O-ring seal 306 flanked by a pair of back up rings 304.

In the dummy couplings of the prior art, the portion of the bore indicated at 27 in FIG. 1 and at 57 in FIG. 2 is exposed to seawater when the coupling is used subsea. It has been found that calciferous deposits may form on this surface which deposits may compromise the sealing ability of the main seal. This effect may occur especially when the main seal slides along the inner bore when the piston moves in response to hydraulic pressure within the coupling. In the improved dummy coupling of the present invention, the hydrostatic pressure seal (346) keeps seawater from entering the portion of the bore indicated at 302 thereby avoiding the build-up of mineral deposits and marine growth. In the illustrated embodiment of FIG. 3, this hydrostatic pressure seal is an O-ring seal (346) retained in a circumferential groove (344) on the outer circumference of the piston.

Figure 4:
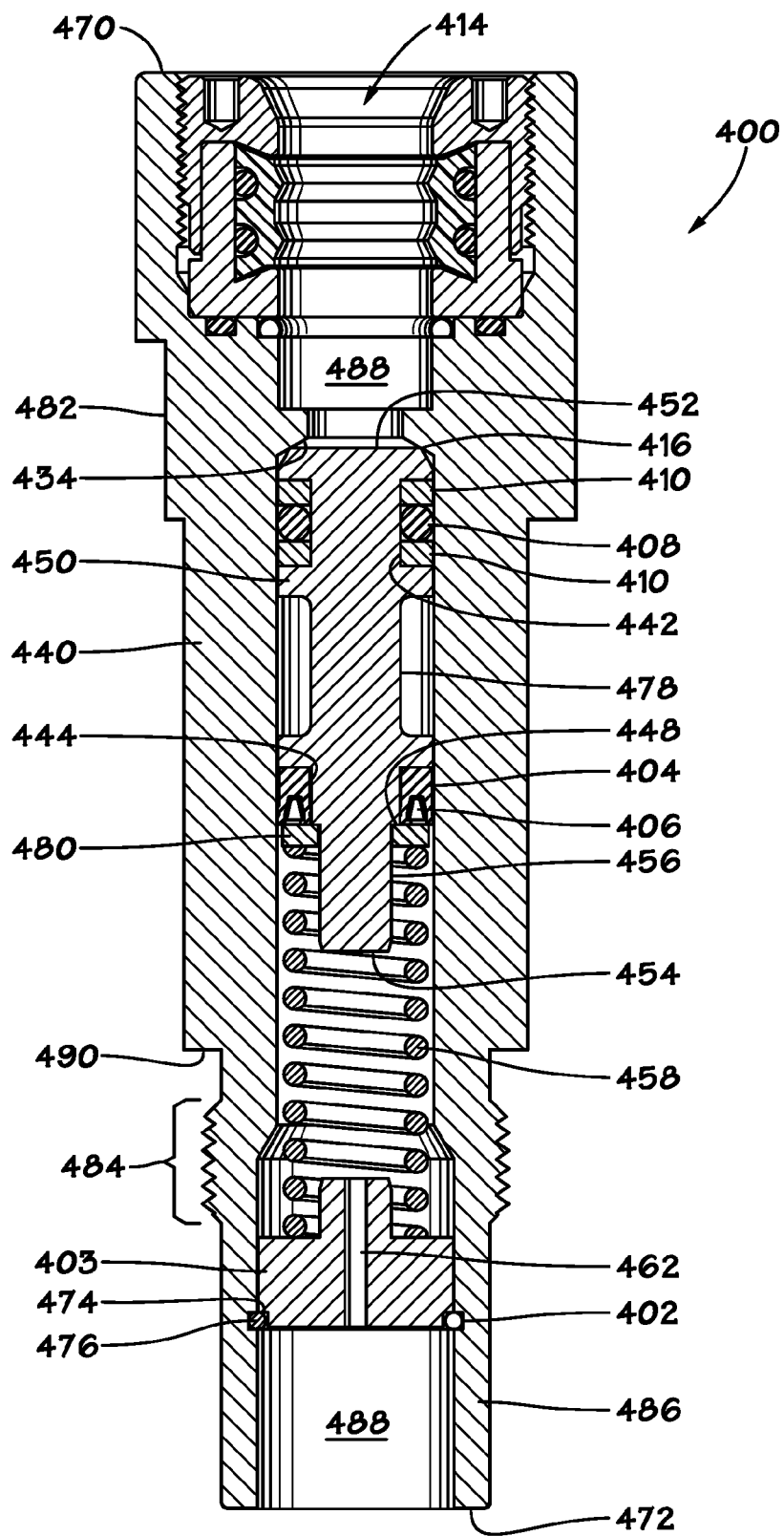
FIG. 4 is a cross-sectional view of a dummy female coupling member according to a second embodiment of the invention.

A second embodiment of the invention is illustrated in FIG. 4. Dummy female hydraulic coupling member 400 comprises generally cylindrical body 440 having central axial bore 488. The outer diameter of body 440 may be stepped, forming external shoulder 490. Portion 484 of the external surface of tail section 486 of coupling body 440 may be threaded for attachment to a manifold plate or the like (not shown).

Wrench flat 482 may be provided in order to engage a tool to draw shoulder 490 of coupling body 440 tightly against such a mounting device.

Coupling body 440 may have an internally threaded section of bore 488 proximate first end 470. Coupling 400 may comprise a seal cartridge in receiving chamber 414 of the type described above in connection with coupling 300.

Piston 450 is provided in a portion of bore 488 (which may act as a cylinder within which piston 450 slides). Piston 450 has a first end 452 oriented towards first end 470 of coupling body 440 and an opposing second end 454 oriented towards second end 472 of coupling body 440.

First end 452 of piston 450 may have a ring-shaped edge 416 which bears against frusto-conical surface 434 on the inner surface of bore 488 to provide a metal-to-metal seal.

Circumferential groove 442 is provided on the exterior surface of piston 450 for containing primary seal 408 (which may be an O-ring seal) and back-up rings 410. Other kinds of bi-directional soft seals may be used.

Second end 454 of piston 450 comprises a portion of reduced outer diameter 456 which forms shoulder 448 on the body of piston 450. Circumferential recess 444 is provided on the exterior of piston 450 adjacent shoulder 448. Washer 480 rests on shoulder 448 and together with recess 444 forms a circumferential groove for holding secondary seal 404. Secondary seal 404 may provide a hydrostatic seal.

Compression spring 458 bears against washer 480 at one end thereof and against spring seat 403 at a second end thereof. Spring seat 403 has a shoulder 474 on one end thereof and is retained in bore 488 by a retainer ring 476 in groove 402 in the wall of bore 488. The retainer ring may be a circlip, C-clip, snap ring, or the like. Spring seat 403 has central axial bore 462 for the passage of fluid into and out of the portion of bore 488 between secondary seal 404 and spring seat 403.

In the absence of differential fluid pressure, spring 458 acting between spring seat 403 and washer 480 on shoulder 448 of piston 450 urges piston 450 against frusto-conical surface 434 forming a metal-to-metal seal.

Recess 444 in the outer circumference of piston 450 contains the secondary seal which may comprise scrapper seal 404. Secondary seal 404 acts to prevent seawater from contacting the portion of bore 488 between primary seal 408 and secondary seal 404 thereby providing an uncontaminated surface for primary seal 408 to seal against. It will be appreciated by those skilled in the art that the axial distance between primary seal 408 and secondary seal 404 should not be less than the full stroke of piston 450 in order to ensure that primary seal 408 contacts only the protected portion of bore 488 during a full stroke of piston 450.

A portion of reduced outside diameter 478 may be provided in piston body 450 between primary seal 408 and secondary seal 404.

In the embodiment of FIG. 4, the hydrostatic pressure seal is a "scraper seal" comprised of a notched elastomer body 404 with a V-shaped metal insert 406 which biases the legs of the elastomer seal in opposing radial directions to enhance the sealing effectiveness of the scraper seal. The V-shaped notch in seal 404 may also act to provide a pressure-energized seal which responds to hydrostatic pressure when the seal is used subsea.

Figure 5:
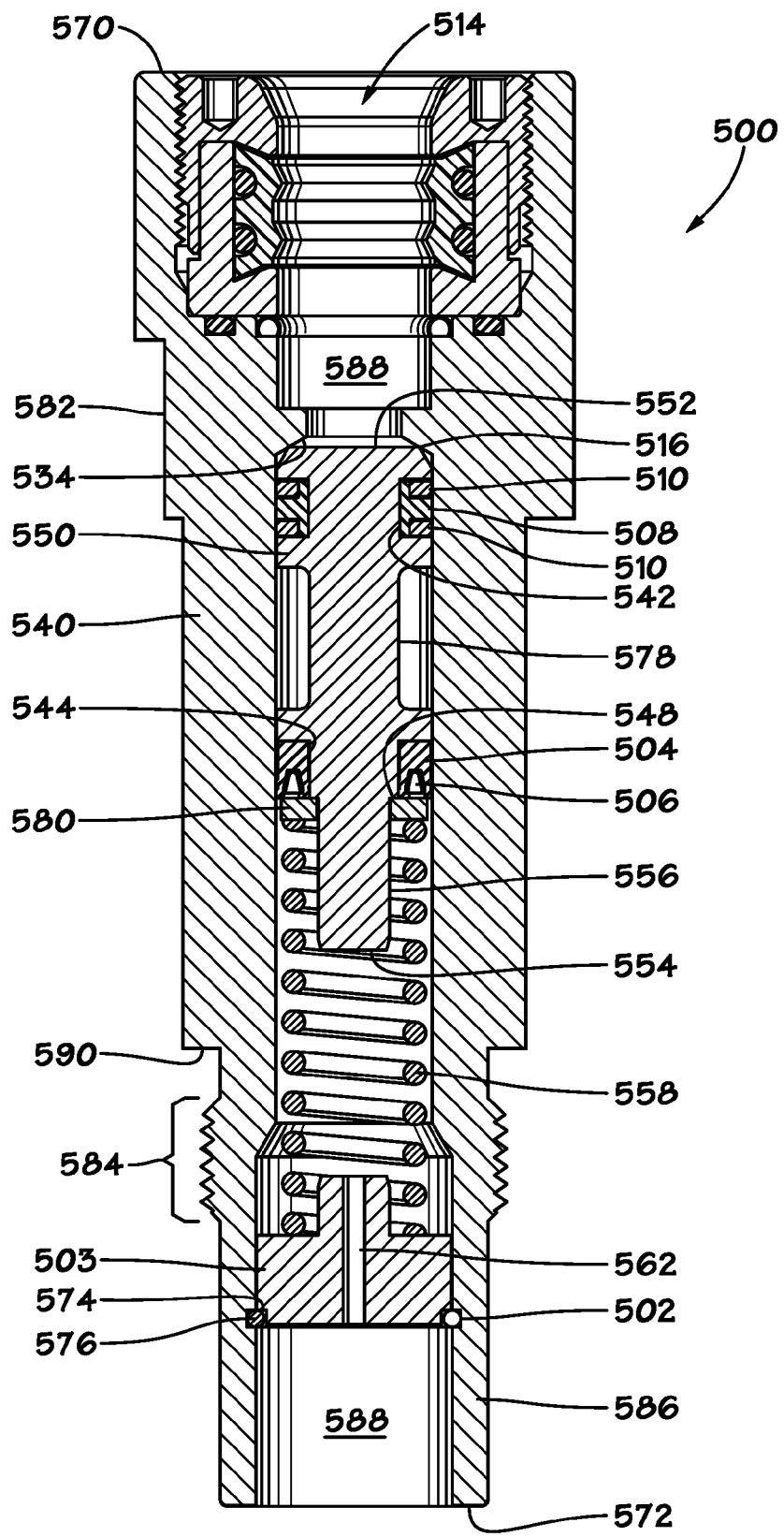
FIG. 5 is a cross-sectional view of a dummy female coupling member according to a third embodiment of the invention.

A third embodiment of the invention is shown in FIG. 5. This embodiment is generally similar to that shown as coupling 400 in FIG. 4.

Dummy female hydraulic coupling member 500 comprises generally cylindrical body 540 having central axial bore 588. The outer diameter of body 540 may be stepped, forming external shoulder 590. Portion 584 of the external surface of tail section 586 of coupling body 540 may be threaded for attachment to a manifold plate or the like (not shown). Wrench flat 582 may be provided in order to engage a tool to draw shoulder 590 of coupling body 540 tightly against such a mounting device.

Coupling body 540 may have an internally threaded section of bore 588 proximate first end 570. Coupling 500 may comprise a seal cartridge in receiving chamber 514 of the type described above in connection with coupling 300.

Piston 550 is provided in a portion of bore 588 (which may act as a cylinder within which piston 550 slides). Piston 550 has a first end 552 oriented towards first end 570 of coupling body 540 and an opposing second end 554 oriented towards second end 572 of coupling body 540.

First end 552 of piston 550 may have a ring-shaped edge 516 which bears against frusto-conical surface 534 on the inner surface of bore 588 to provide a metal-to-metal seal.

Annular groove 542 in the outer circumference of piston 550 contains the primary seal. The primary seal in this embodiment comprises T-seal 508 flanked by a pair of backup rings 510. Backup rings 510 may be fabricated of metal or an engineering plastic such as PEEK, DELRIN® acetal, TEFLON® polytetrafluoroethylene, or the like. A metal-to-metal seal may be provided at 516.

Second end 554 of piston 550 comprises a portion of reduced outer diameter 556 which forms shoulder 548 on the body of piston 550. Circumferential recess 544 is provided on the exterior of piston 550 adjacent shoulder 548. Washer 580 rests on shoulder 548 and together with recess 544 forms a circumferential groove for holding secondary seal 504. Secondary seal 504 may be a hydrostatic seal.

Compression spring 558 bears against washer 580 at one end thereof and against spring seat 503 at a second end thereof. Spring seat 503 has a shoulder 574 on one end thereof and is retained in bore 588 by a retainer ring 576 in groove 502 in the wall of bore 588. The retainer ring may be a circlip, C-clip, snap ring, or the like. Spring seat 503 has central axial bore 562 for the passage of fluid into and out of the portion of bore 588 between secondary seal 504 and spring seat 503.

In the absence of differential fluid pressure, spring 558 acting between spring seat 503 and washer 580 on shoulder 548 of piston 550 urges piston 550 against frusto-conical surface 534 forming a metal-to-metal seal.

Recess 544 in the outer circumference of piston 550 contains the secondary seal which may comprise scrapper seal 504. Secondary seal 504 acts to prevent seawater from contacting the portion of bore 588 between primary seal 508 and secondary seal 504 thereby providing an uncontaminated surface for primary seal 508 to seal against. It will be appreciated by those skilled in the art that the axial distance between primary seal 508 and secondary seal 504 should not be less than the full stroke of piston 550 in order to ensure that primary seal 508 contacts only the protected portion of bore 588 during a full stroke of piston 550.

A portion of reduced outside diameter 578 may be provided in piston body 550 between primary seal 508 and secondary seal 504.

In the embodiment of FIG. 5, the hydrostatic pressure seal is a "scraper seal" comprised of a notched elastomer body 504 with a V-shaped metal insert 506 which biases the legs of the elastomer seal in opposing radial directions to enhance the sealing effectiveness of the scraper seal. The V-shaped notch in seal 504 may also act to provide a pressure-energized seal which responds to hydrostatic pressure when the seal is used subsea.

Figure 6:
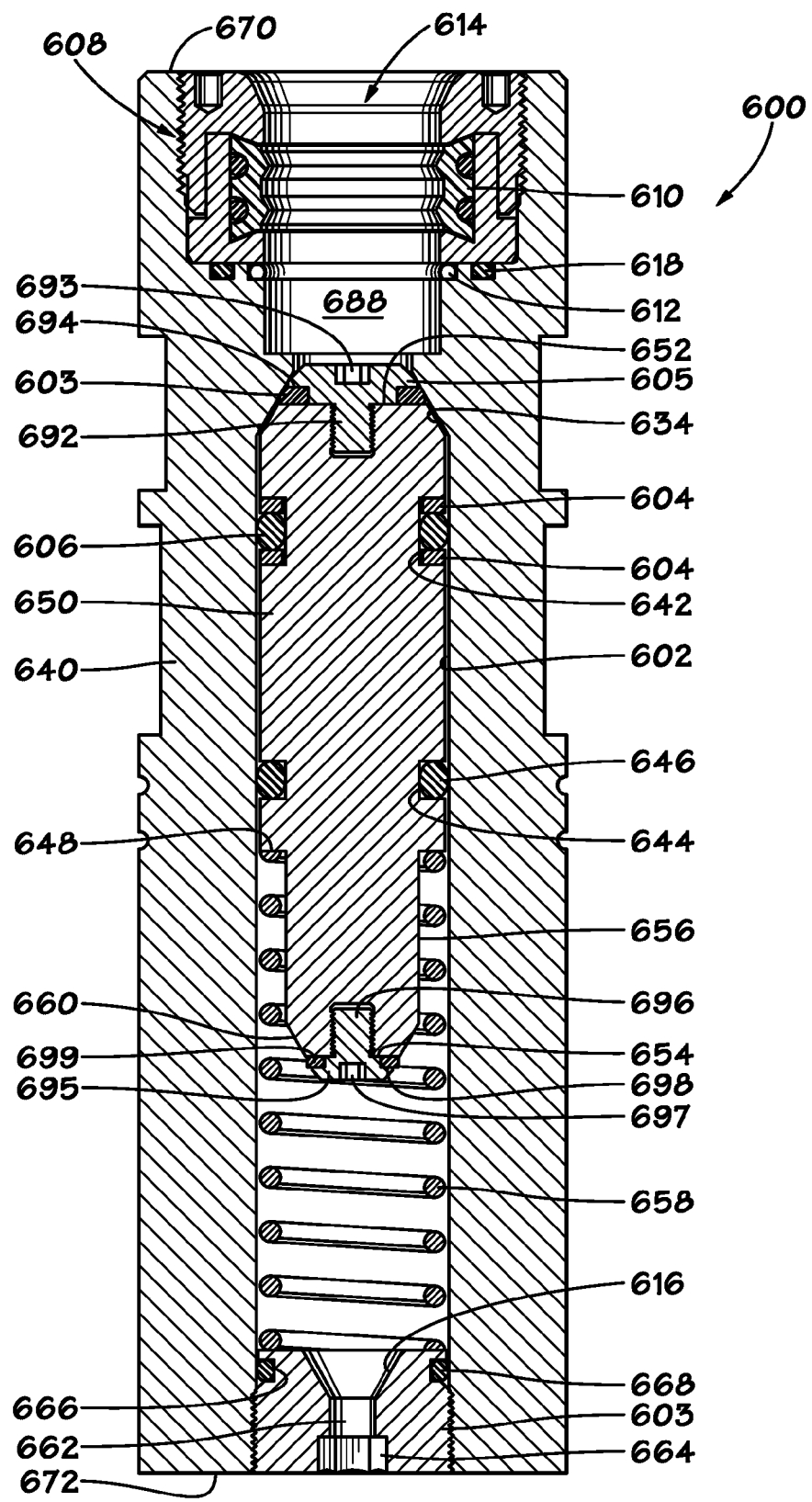
FIG. 6 is a cross-sectional view of a dummy female coupling member according to a fourth embodiment of the invention.

A fourth embodiment of the invention is shown in FIG. 6. This embodiment has the same general configuration, seal cartridge, primary seal and hydrostatic pressure seal as the embodiment illustrated in FIG. 3. However, in this embodiment, the metal-to-metal seals at either end of the piston are replaced with poppet-type seals. The poppet seals are comprised of a polymer ring 603, 699 retained by a metal insert 605, 695. Poppet-type seals of different sizes may be provided on either end of the piston. As shown in FIG. 6, the poppet seal on the lower end of the piston (as oriented in FIG. 6) may seal against frusto-conical surface 616 on the spring seat. The poppet seals may provide enhanced sealing of fluid pressure within the system.

An improved dummy female hydraulic coupling 600 according to this fourth embodiment of the invention is shown in FIG. 6. Receiving chamber 614 has crown-type probe seal 610 contained in seal cartridge 608 which may be the same as seal cartridge 308 described above.

Seal cartridge 608 retains metal C-seal 612 on a shoulder within bore 688 of coupling body 640. A metal C-seal of the type illustrated is disclosed in U.S. Pat. No. 6,962,347. O-ring 618 in an adjacent groove on this shoulder provides a seal between seal cartridge 608 and body 640 of coupling member 600.

Piston 650 is provided in a portion of bore 688 (which may act as a cylinder within which piston 650 slides). Piston 650 has a first end 652 oriented towards first end 670 of coupling body 640 and an opposing second end 654 oriented towards second end 672 of coupling body 640.

First end 652 of piston 650 may have an internally threaded recess for engaging externally threaded stem 692 on poppet seal retainer 605. Poppet seal retainer 605 has shoulder 694 for retaining polymer ring seal 603 against first end 652 of piston 650. Seal 603 bears against frusto-conical surface 634 on the inner surface of bore 688. Hexagonal recess 693 may be provided for engaging a tool (e.g., an Allen wrench) for installing and/or removing seal retainer 605.

Second end 654 of piston 650 comprises a portion of reduced outer diameter 656 which forms shoulder 648 in the body of piston 650. Frusto-conical surface 660 may be provided in portion 656 proximate second end 654.

A second poppet-type seal may be provided on the second end 654 of piston 650. Second end 654 of piston 650 may have an internally threaded recess for engaging externally threaded stem 696 on poppet seal retainer 695. Poppet seal retainer 695 has shoulder 698 for retaining polymer ring seal 699 against second end 654 of piston 650. Seal 699 bears against frusto-conical surface 616 on the inner surface of bore 662 of spring seat 603. Hexagonal recess 697 may be provided for engaging a tool (e.g., an Allen wrench) for installing and/or removing seal retainer 695.

As shown in FIG. 6, seal retainer 695 may be of a different size than seal retainer 605.

Compression spring 658 bears against shoulder 648 at one end thereof and against spring seat 603 at a second end thereof. Spring seat 603 may be externally threaded and engage an internally-threaded portion of bore 688 proximate second end 672. A groove 666 in the external, cylindrical surface of spring seat 603 may contain O-ring seal 668.

Spring seat 603 has central axial bore 662 which has frusto-conical surface 616 at one end and hexagonal wrench receiver 664 at an opposing end thereof. Frusto-conical surface 616 may be sized and configured to bear against poppet seal 699 on piston 650 when it is at one extreme of its travel (downward in FIG. 6) thereby providing a seal between piston 650 and spring seat 603.

In the absence of differential fluid pressure, spring 658 acting between spring seat 603 and shoulder 648 on piston 650 urges piston 650 against surface 634.

Annular groove 642 in the outer circumference of piston 650 contains the primary seal which may comprise O-ring 606 flanked by a pair of back up rings 604.

Annular groove 644 in the outer circumference of piston 650 contains the secondary seal which may comprise O-ring 646. Secondary seal 646 acts to prevent seawater from contacting the portion of bore 688 indicated at 602 thereby providing an uncontaminated surface for primary seal 606 to seal against. It will be appreciated by those skilled in the art that the axial distance between primary seal 606 and secondary seal 646 should not be less than the full stroke of piston 650 in order to ensure that primary seal 606 contacts only protected portion 602 of bore 688 during a full stroke of piston 650.

Under the influence of hydraulic fluid pressure from the probe of a male coupling member (not shown) inserted in receiving chamber 614, the piston may move downward in FIG. 6 and establish a seal at frusto-conical seat 616 on the bottom seat. However, fluid displaced from receiving chamber 614 is retained by the main seal which, in the illustrated embodiment, is comprised of O-ring seal 606 flanked by a pair of back up rings 604.

In the dummy couplings of the prior art, the portion of the bore indicated at 27 in FIG. 1 and at 57 in FIG. 2 is exposed to seawater when the coupling is used subsea. It has been found that calciferous deposits may form on this surface which deposits may compromise the sealing ability of the main seal. This effect may occur especially when the main seal slides along the inner bore when the piston moves in response to hydraulic pressure within the coupling. In an improved dummy coupling according to the present invention, the hydrostatic pressure seal keeps seawater from entering the portion of the bore indicated at 602 thereby avoiding the build-up of mineral deposits and marine growth. In the illustrated embodiment of FIG. 6, this hydrostatic pressure seal is an O-ring seal (646) retained in a circumferential groove (644) on the outer circumference of the piston.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A dummy undersea female hydraulic coupling member comprising:
    a body having a central axial bore;
    a receiving chamber within the central axial bore dimensioned to receive the probe of a corresponding male coupling member;
    a water displacement expansion chamber having a first end proximate the receiving chamber and an opposing second end, the water displacement expansion chamber being in fluid communication with the receiving chamber;
    a piston in the water displacement expansion chamber, the piston having a first end and an opposing second end, the piston slideable in response to pressure acting against the first end and second end so as to allow fluid to move between the receiving chamber and the water displacement expansion chamber;
    a spring which acts on the piston in the direction of the receiving chamber;
    a frusto-conical surface on the first end of the piston and a corresponding frusto-conical surface at the first end of the water displacement expansion chamber sized and spaced to provide a seal to the piston when the piston is at the limit of its stroke in response to the action of the spring;

wherein the piston has a primary annular seal proximate the first end thereof and a secondary annular seal axially displaced from the primary annular seal in the direction of the second end thereof.

2. The dummy undersea female coupling member recited in claim 1 further comprising:

a frusto-conical surface on the second end of the piston; and, a spring seat in the water displacement expansion chamber having a corresponding frusto-conical surface sized and spaced to provide a seal to the piston when the piston is at the limit of its stroke in response to fluid pressure acting on the first end of the piston.

3. The dummy undersea female coupling member recited in claim 2 wherein the frusto-conical surface on the spring seat is a portion of a central axial bore through the spring seat.

4. The dummy undersea female coupling member recited in claim 1 wherein the primary annular seal on the piston comprises an O-ring.

5. The dummy undersea female coupling member recited in claim 4 wherein the primary annular seal comprises a pair of back-up rings flanking the O-ring.

6. The dummy undersea female coupling member recited in claim 1 wherein the secondary annular seal on the piston comprises an O-ring.

7. The dummy undersea female coupling member recited in claim 1 wherein the secondary annular seal on the piston is axially displaced from the primary annular seal on the piston by a distance that is not less than the full stroke of the piston in the water displacement expansion chamber.

8. The dummy undersea female coupling member recited in claim 2 further comprising an annular seal on the spring seat that seals between the spring seat and the central axial bore.

9. A dummy undersea female hydraulic coupling member comprising:

a body having a central axial bore and a frusto-conical surface therein;

a receiving chamber within the central axial bore dimensioned to receive the probe of a corresponding male coupling member;

a water displacement expansion chamber having a first end proximate the receiving chamber and an opposing second end, the water displacement expansion chamber being in fluid communication with the receiving chamber;

a piston in the water displacement expansion chamber, the piston having a first end and an opposing second end, the piston slideable in response to pressure acting against the first end and second end so as to allow fluid to move between the receiving chamber and the water displacement expansion chamber;

a spring which acts on the piston in the direction of the receiving chamber;

a spring seat within the central axial bore which bears against the spring and having a central axial bore with a frusto-conical surface at one end thereof;

wherein the piston has a primary annular seal proximate the first end thereof, a secondary annular seal axially displaced from the primary annular seal in the direction of the second end thereof, a first seal at the first end thereof sized and spaced to engage the frusto-conical surface in the central axial bore of the coupling body and a second seal at the second end thereof sized and spaced to engage the frusto-conical surface in the spring seat.

10. The dummy undersea female coupling member recited in claim 9 wherein the secondary annular seal on the piston is axially displaced from the primary annular seal on the piston by a distance that is not less than the full stroke of the piston in the water displacement expansion chamber.

11. The dummy undersea female coupling member recited in claim 9 wherein the first and second seals comprise a polymer ring seal held against an end of the piston by an insert connected to an end of the piston and having an undercut shoulder sized to contain a portion of the polymer ring.

12. The dummy undersea female coupling member recited in claim 9 wherein the first and second seals have different outside diameters.

13. A dummy undersea female hydraulic coupling member comprising:

a body having a central axial bore;

a receiving chamber within the central axial bore dimensioned to receive the probe of a corresponding male coupling member;

a water displacement expansion chamber having a first end proximate the receiving chamber and an opposing second end, the water displacement expansion chamber being in fluid communication with the receiving chamber;

a piston in the water displacement expansion chamber, the piston having a first end and an opposing second end, the piston slideable in response to pressure acting against the first end and second end so as to allow fluid to move between the receiving chamber and the water displacement expansion chamber;

a shoulder on the outer circumference of the piston proximate the second end of the piston;

an annular groove in the outer circumference of the piston adjacent the shoulder on the outer circumference;

a washer having a central axial bore sized such that the washer is supported on the shoulder on the outer circumference of the piston proximate the second end of the piston;

a spring which acts on the piston via the washer in the direction of the receiving chamber;

wherein the piston has a primary annular seal proximate the first end thereof and a secondary annular scrapper seal in the annular groove in the outer circumference of the piston adjacent the shoulder on the outer circumference which is axially displaced from the primary annular seal in the direction of the second end thereof.

14. The dummy female hydraulic coupling member recited in claim 13 wherein the primary annular seal comprises an O-ring.

15. The dummy female hydraulic coupling member recited in claim 14 further comprising a pair of back-up rings flanking the O-ring.

16. The dummy female hydraulic coupling member recited in claim 13 wherein the primary annular seal comprises a T-seal flanked by a pair of back-up rings.

17. The dummy female hydraulic coupling member recited in claim 16 wherein the back-up rings comprise an engineering plastic.

18. The dummy female hydraulic coupling member recited in claim 13 wherein the secondary scrapper seal comprises a V-shaped notch and a metal insert in the V-shaped notch which acts to deflect at least a portion of the seal in a radial direction.

19. The dummy female hydraulic coupling member recited in claim 13 further comprising a frusto-conical surface in the central axial bore of the coupling body and a circular edge on the first end of the piston sized and spaced to engage the frusto-conical surface and form a metal-to-metal seal between the piston and the coupling body.

* * * * *